United States Patent

Thorne-Thomsen

[15] 3,635,501
[45] Jan. 18, 1972

[54] QUICK CONNECT-DISCONNECT HOSE COUPLING

[72] Inventor: Thomas Thorne-Thomsen, Godfrey, Ill.
[73] Assignee: Olin Mathieson Chemical Corporation
[22] Filed: Nov. 14, 1969
[21] Appl. No.: 871,614

Related U.S. Application Data

[63] Continuation of Ser. No. 662,533, Aug. 22, 1967, abandoned.

[52] U.S. Cl. ...................... 285/34, 285/81, 285/314, 285/315, 285/321
[51] Int. Cl. ........................................ F16l 35/00
[58] Field of Search ............. 285/34, 81, 82, 84, 85, 86, 285/277, 314, 315, 316, 321, 322

[56] References Cited

UNITED STATES PATENTS

| | | |
|---|---|---|
| 520,952 | 6/1894 | Cox .............................. 285/34 |
| 965,286 | 7/1910 | Ferguson ....................... 285/34 |
| 1,477,440 | 12/1923 | Grier .............................. 285/34 |
| 2,463,179 | 3/1949 | Iftiger ............................ 285/34 |
| 3,352,576 | 11/1967 | Thomsen ................... 285/321 X |
| 3,390,898 | 7/1968 | Sumida .......................... 285/34 |
| 3,467,476 | 9/1969 | Konig ........................... 285/321 |

FOREIGN PATENTS OR APPLICATIONS

| | | |
|---|---|---|
| 1,221,842 | 9/1962 | France ........................... 285/81 |
| 966,396 | 8/1957 | Germany ..................... 285/322 |

Primary Examiner—Dave W. Arola
Attorney—Robert H. Bachman

[57] ABSTRACT

A quick connect-disconnect coupling is provided comprising an adaptor-retainer having openings therein which receive a snap ring. A resilient sealing member is held in place by the retaining adaptor. A cam-ring is also provided which in one position will allow introduction of a standard male coupling and in another position will hold the snap ring in engagement with the male coupling.

6 Claims, 14 Drawing Figures

PATENTED JAN 18 1972

INVENTOR:
THOMAS THORNE-THOMSEN

BY Henry W. Cummings

ATTORNEY

INVENTOR:
THOMAS THORNE-THOMSEN

BY Henry W. Cummings

ATTORNEY

INVENTOR:
THOMAS THORNE-THOMSEN

BY Henry W Cummings

ATTORNEY

INVENTOR:
THOMAS THORNE-THOMSEN

BY Henry W. Cummings
ATTORNEY

QUICK CONNECT-DISCONNECT HOSE COUPLING

This is a continuation of application Ser. No. 662,533, filed Aug. 22, 1967, and now abandoned.

This invention relates to quick connect-disconnect couplings, and has as its object, a coupling which can be quickly connected and disconnected without the need of extensive turning of threads in order to engage the couplings, which is inexpensive to manufacture.

FIG. 13 shows the quick-connect just before engagement and FIG. 14 shows the quick-connect during engagement.

The present invention comprises a retainer having at least one opening and holding a seal in operative position, a snapring fitting into said opening and a cam-ring having a portion of small and a portion of large diameter to permit the snapring to expand and allow insertion and removal of a male coupling.

Figure 1:
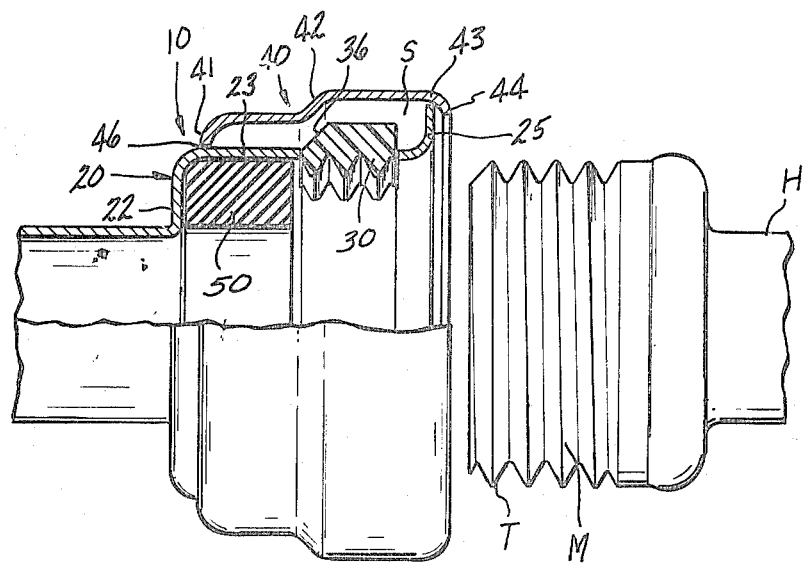
FIG. 1 is a sectional view of one embodiment of the present invention showing the quick-connect prior to introduction of the male member.
Figure 3:
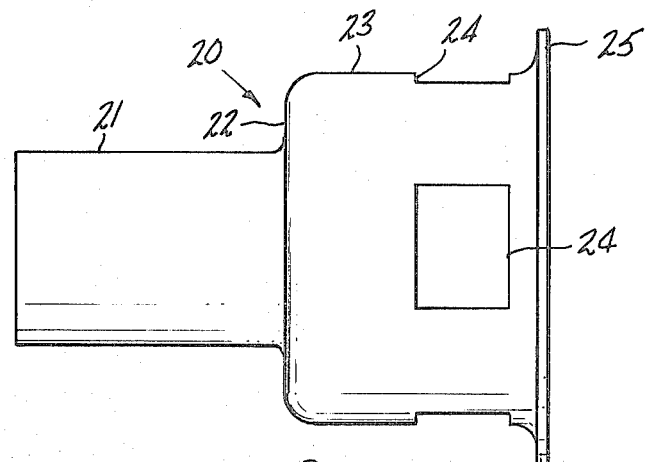
FIGS. 3 and 6 show the adapter of FIG. 1 in detail, respectively without, and with, a threaded end portion.

According to one embodiment of the present invention in FIG. 1, there is shown a quick-connect coupling designated generally as 10 comprising an adapter 20 which, as can be seen from FIG. 3, has a tubular, elongated portion 21. The adapter diameter then increases at 22 to form the main portion thereof 23 having a plurality of openings 24 therein. The number of openings can vary as desired, but is preferably from 2 to 6. The adapter portion terminates in flange portion 25.

Figure 2:
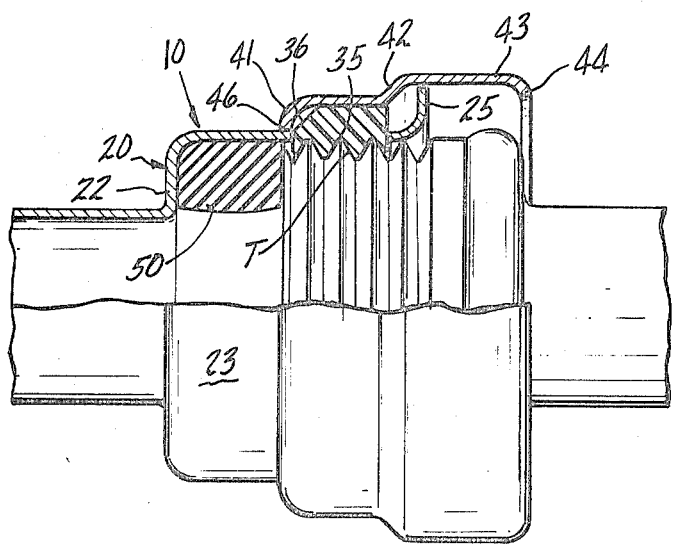
FIG. 2 is a view of the quick-connect of FIG. 1 showing the male member in engagement with the quick connect.
Figure 4:
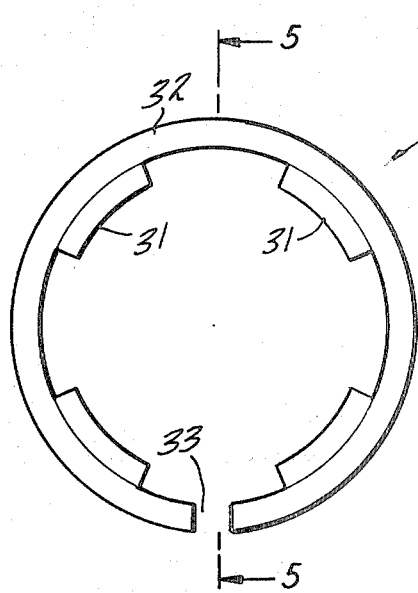
FIG. 4 is a top view of the snap ring of FIG. 1
Figure 5:
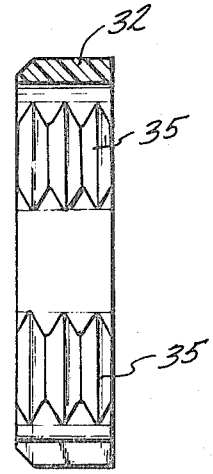
FIG. 5 is the section along the lines 5—5 of FIG. 4.

The openings 24 of the adapter are filled by an appropriately dimensioned snapring 30, which is shown in greater detail in FIGS. 4 and 5. The snapring 30 contains a plurality of lobes 31 extending from circular portion 32, the lobes having threads 35. The number of lobes depends upon the number of openings 24 in the adapter 20. The ring has an expression opening 33 which allows expansion of the snapring in a manner to be described hereinafter. As shown in FIG. 1 and 2, the snap ring also has a slanting portion on the top thereof, 36.

Mounted on the adapter is a cam-ring 40. The lower end portion 41 is adopted to move along the portion 23 of the adapter. As is apparent from FIG. 1, the diameter of the cam-ring increases at 42 to an upper portion 43. This upper portion is adopted to move along flange portion 25 of the adapter 20. End portion 44 is reduced in diameter to a small extent to engage flange 25 in the position shown in FIG. 1.

The sealing means must allow compressibility of one thread pitch to provide proper sealing. While other means may be provided to do this, the preferred sealing constitutes a gasket 50 which engages portions 22 and 23 of the adapter. The material of which the gasket 50 is made is very important. It must be very resilient, and must have a Durometer reading of below about 50 to insure the proper resilience. The gasket may be made of any of the natural or synthetic rubbers, including such substances as poly-vinyl-chloride, provided that the necessary resilience is achieved.

In the operation or the quick-connect of FIGS. 1—5 when a standard male hose coupling M, for example, attached to hose H, is introduced, it forces the snapring 30 to expand upwardly by means of expansion section 33 into the space S between the top of the snapring 30 and the cam-ring 40. The male member will move forward until it encounters the gasket 50. The threads T on the male member will engage the threads 35 of the snapring.

To hold the male member in place, the cam-ring 40 is moved from left to right in FIG. 1. Thus, the lower surface 41 of the cam-ring will ride along the surface 23 of the adapter until the slanting portion 36 of the snapring is reached. As shown in FIG. 2, the cam-ring 40 will hold the snapring threads 35 in engagement with the threads T on the male member.

The snapring is dimensioned so that the standard male coupling M will engage the three teeth 31 shown in FIG. 1, when properly inserted. It is obvious, however, that for particularly strenuous or jarring applications, more than three teeth could be provided on the snapring.

In this connection one or more friction nibs 46 may be provided at one or more places around the circumference of adapter 20 which hold cam-ring 40 in the position shown in FIG. 2. Still more effective engagement is obtained if the main portion 23 of the adapter is slightly tapered outwardly from left to right in FIGS. 1 and 2.

However, it is to be emphasized that those skilled in the art can readily devise other means to hold cam-ring 40 in the position shown in FIG. 2.

Furthermore, if the male member does not fit exactly, flexibility of the seal 50 will adjust to the different orientation and leakage will be avoided. However, in the structure shown in the drawing, it has been found that this will only be the case for sealing members having Durometer values below 50. Seals having normal Durometer values 80 and 90 will not effect proper sealing when the coupling is used if the threads 31 do not properly engage the threads T on the male member when the latter is inserted.

To disconnect the coupling, it is only necessary to move the cam-ring from right to left in FIG. 1 using just enough force to overcome the frictional hold of nibs 46, to a point where the snapring 34 can again expand into the space S. When this is done, the male coupling can be removed by simply pulling it as the snapring S expands into the space S by means of expansion opening 33.

The adapter 20 shown in FIG. 3 is designed for the case where it will be shrink fitted, crimped, or otherwise fitted into a sprinkler, nozzle, hose, a carwash-brush, liquid insecticide attachment or other like garden hose and/or washing articles. Those skilled in the art can readily determine proper fabrication methods for holding the adapter shank 21 in engagement with the nozzles, sprinklers, carwash-brushes, hoses, liquid insecticide spray attachments and related articles.

Figure 6:
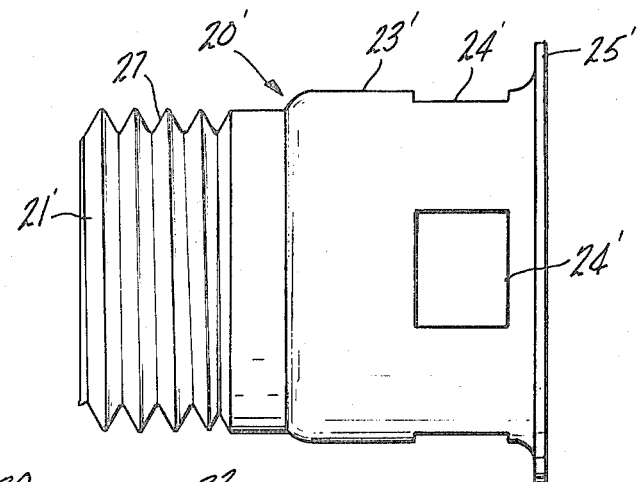

In the embodiment shown in FIG. 6, the structure of the adapter 20', insofar as flange 25', openings 24' and portions 23' and 23'A are concerned, the structure is the same as that shown in FIG. 2. However, it is apparent shank portion 21' differs from shank 21 of FIG. 2 in that threads 27' are provided. The threads 27' allow the quick connect-disconnect to be screwed into the standard threaded female coupling which are found on presently available garden hose equipment including nozzles, sprinklers, hoses, carwash-brushes assemblies insecticide dispensers and related articles.

Thus, after the quick connect-disconnect is screwed into these appliances, these appliances can then be connected to a male hose coupling without the need of extended turning of threaded members. Additionally, if the quick connect-disconnect having the threaded shank of FIG. 6 is screwed into the standard female hose coupling, the hose can very easily be connected to conventional outdoor water taps which are generally standard male hose couplings. Thus, the many uses of the quick connect-disconnect of the present invention are apparent.

Figure 7:
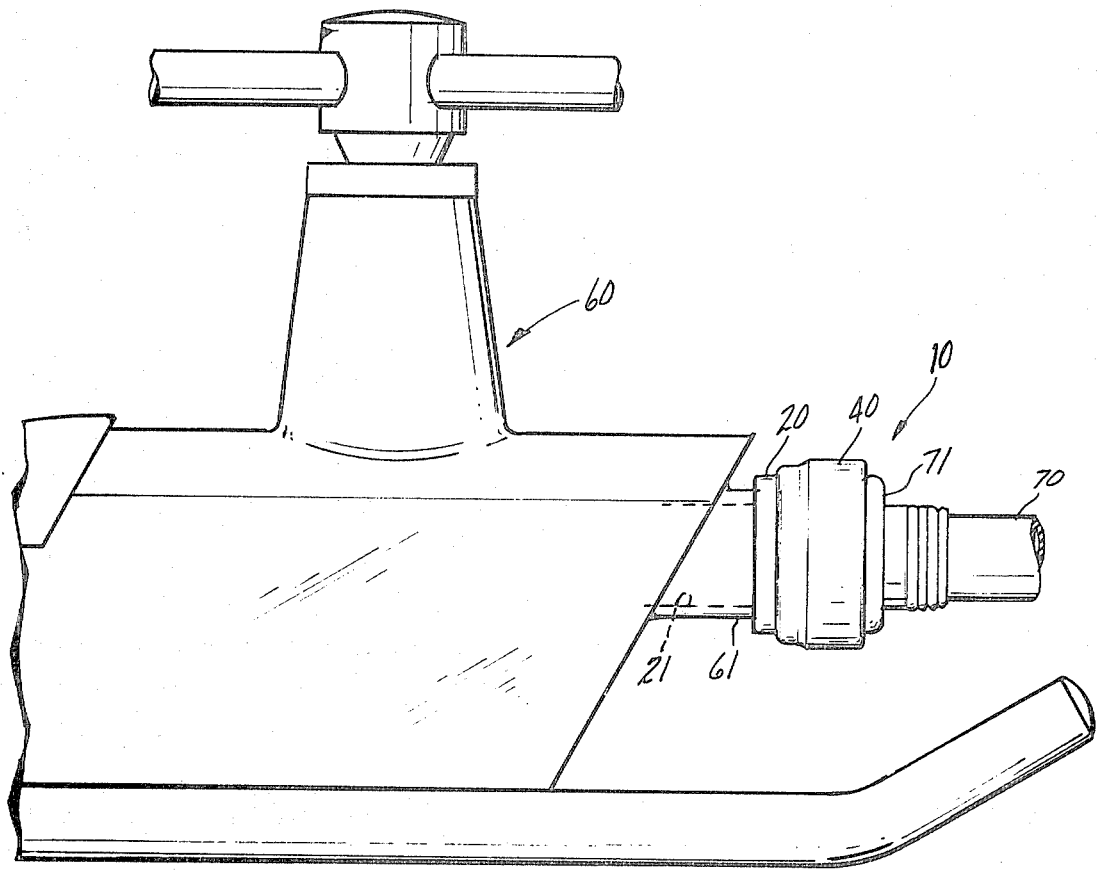
FIG. 7 is a view of the quick connect of FIGS. 1 and 2 holding a sprinkler in engagement with a garden hose.

As an example, in FIG. 7, there is shown a typical sprinkler 60. The quick connect-disconnect of the present invention 10 is shown attached to the inlet 61 of the sprinkler. The cam-ring 40 and the adapter 20 of the present invention can be seen holding the sprinkler 60 in engagement with a hose 70 having a standard male hose coupling 71. The elongated portion 21 is shown in dotted lines in engagement with sprinkler inlet 61. The details of the sprinkler 60 are not shown because, except for the inlet, the sprinkler construction forms no part of the present invention. Furthermore, the construction details of such sprinklers are well known to those in the sprinkler and garden hose product art.

Figure 8:
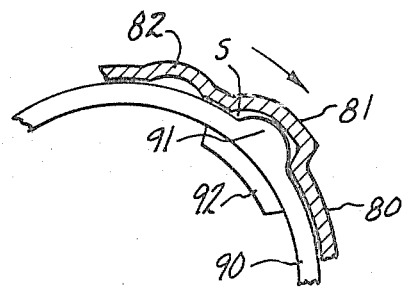
FIG. 8 is a sectional view of another embodiment of the invention before the male member is introduced.
Figure 9:
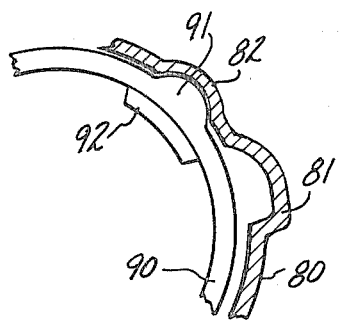
FIG. 9 is a view of the quick connect of FIG. 8 in the engaged position.

In another embodiment of the present invention shown in FIGS. 8 and 9, the locking mechanism operates differently from the embodiment shown in FIG. 1. In FIG. 1, the contour of the cam-ring 40 is the same at any point on the circumference. However, as is apparent from FIG. 8, in this particular embodiment the contour of the cam-ring varies around the circumference. Thus, in the cam-ring 80 there are a plurality of enlarged portions 81 corresponding to the number of lobes 91 in the snapring 90.

Additionally, there are a plurality of detents in the cam-ring, 82. Also, the snapring 90 again has a lobe threaded section 92 which is adopted to engage the threads on a male hose coupling not shown.

In order to utilize the coupling of this embodiment of the invention, the male member is introduced into the quick connect, the threads of the male member contacting the threads in threaded lobe section 92. The male member will cause the snapring 90 to expand into the space S.

In order to secure the male member in the quick connect, the cam-ring 80 is rotated in a clockwise direction as shown by the arrow so that the detent 82 engages the lobe 91 of the snapring. Thus, as shown in FIG. 9, the detent 82 thus acts to hold the threaded portion 92 in engagement with the threads on the male member.

When it is desired to disconnect the coupling, the cam-ring 80 is rotated in the opposite direction, counterclockwise in this example to the position shown in FIG. 8. The male member can be withdrawn and in so doing, the snapring 90 will expand into space S and free the male member.

Figure 12:
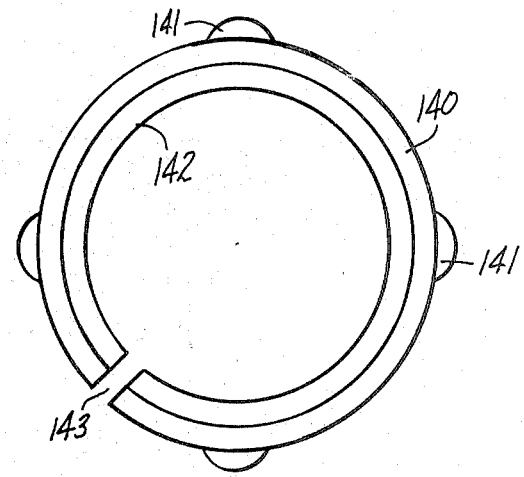
FIG. 12 shows the shape of the snap ring used in FIGS. 10 and 11.
Figure 10:
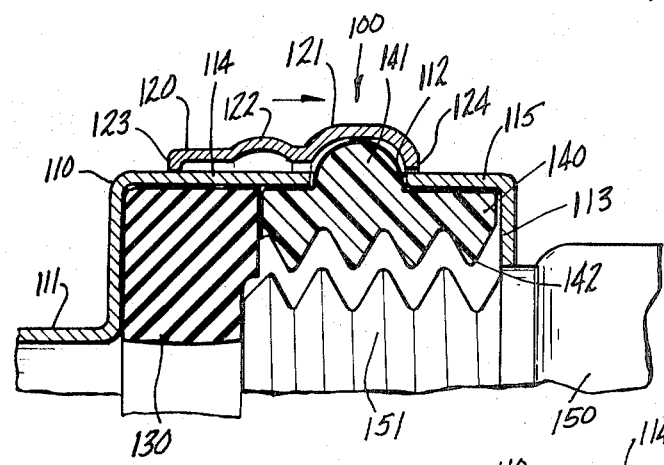
FIG. 10 is a sectional view of another embodiment of the invention showing the male member after it has been introduced but before engagement and FIG. 11 is a view of the embodiment of FIG. 10 showing the quick-connect engaged with the male member.
Figure 11:
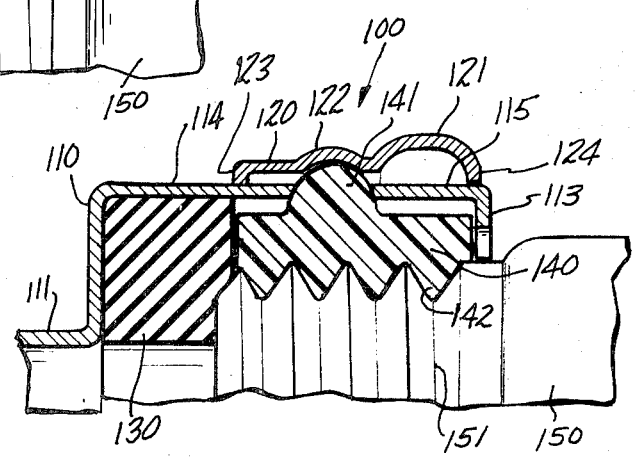

Another embodiment of the present invention is shown in FIG. 10, 11 and 12. A quick connect-disconnect 100 is shown having a retainer 110. The retainer has a shank portion 111 which may or may not be threaded as indicated in FIGS. 6 and 3, respectively. The retainer has openings 112 and a flange portion 113. In the openings 112 is fitted one or more snapring lobes 141 corresponding to the number of openings 112, projecting from the snapring 140. Additionally, the snapring has threads 142, and an expansion section 143.

A cam-ring 120 is positioned above the retainer 110 and snapring 140. The cam-ring has a large detent 121 and a small detent 122. An end portion 123 of the cam-ring rides along the surface 114 of retainer 110. A second end portion 24 of the cam-ring rides above a second surface 115 of the retainer.

The snapring 140 is made of resilient material and is biased outwardly to fit snugly into the large detent 121. Thus, upon introduction of a male hose coupling 150, the coupling proceeds inwardly until the sealing member 130 is encountered. It does not contact any snapring threads as it is so introduced. After the seal 130 is encountered, in order to hold the male coupling in place, the cam-ring 120 is moved from left to right. In so doing, the cam-ring 120 forces the snapring 140 and threads thereof 142 downwardly to be in engagement with the threads 151 of the male coupling, as shown in FIG. 11. The small detent 122 holds the lobes 141 in place and insures that the cam-ring will not return to the portion shown in FIG. 10 if occasional jarring of the unit occurs.

In order to release the coupling, it is merely necessary to move the cam-ring 120 from right to left, resulting in the snapring returning to the portion shown in FIG. 10, because of its outward bias.

The male coupling can then be pulled out without encountering any obstruction. As was previously the case, it is desirable to make the seal 130 of a material having a Durometer value of below 50 for the reasons previously discussed.

If desired, the snapring 140 can easily be replaced should it become damaged by merely removing the old one and forcing in a new one into the openings 112 of the retainer.

It is to be pointed out that a second detent 122 need not be provided if some other friction is provided to hold the lobe 141 in the position shown in FIG. 11. For example, friction nibs could be used. Other ways of providing this friction will be apparent to those skilled in the art.

Figure 13:
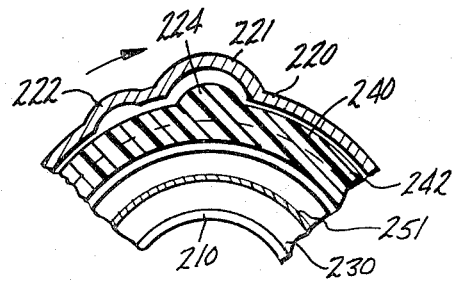
FIGS. 13 and 14 are sectional views illustrating a modification of the embodiment shown in FIGS. 10 through 12.
Figure 14:
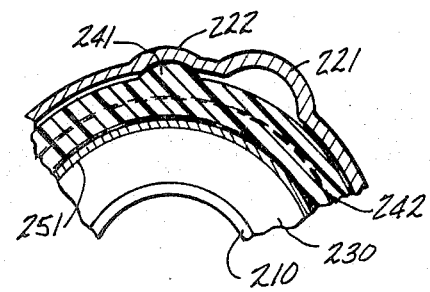

FIGS. 13 and 14 show a modification of the embodiment shown in FIGS. 10 through 12. In this embodiment, the cam-ring is rotated to engage the male coupling.

Thus, as shown in FIG. 13, a male coupling having threads 251 has just been inserted into the coupling and has contacted a seal 230 engaged against retainer 210. Snapring 240 shaped similarly to snapring 140 in FIG. 12, having lobes 241, is resiliently loaded outwardly and is held in place by cam-ring 220. The cam-ring 220 has large detents 221 and small detents 222 of reduced diameter. The retainer 210 holds a seal 230 in place in a manner similar to that shown in FIG. 10.

Thus, by rotating the cam-ring 220 45°, the snap ring 240 engages the threads 25' of a male coupling as shown in FIG. 14. The small detent 222 holds the lobe 241 in place, which in turn, holds threads 242 in engagement with threads 251 on the male coupling.

In order to disconnect the coupling, it is merely necessary to rotate the cam-ring 45° in the other direction, allowing the snapring to expand into large detent 221, and freeing threads 251 of the male member for removal.

It is obvious that the number of detents 221 and the lobes 241, and the rotational direction can be varied by those skilled in the art.

It should be noted, however, that there must be some frictional means provided, such as small detents 222 to hold the snapring in the position shown in FIG. 14.

It is to be understood that the invention is not limited to the illustrations described and shown herein, which are deemed to be merely illustrative of the best modes of carrying out the invention, and which are susceptible of modifications of form size, arrangement of parts and detail of operation.

I claim:

1. A quick connect-disconnect comprising:
   A. a retainer holding a resilient seal in operative position, said retainer having at least one opening,
   B. a snapring for engaging a threaded male coupling at least a portion of which fits into said opening,
   C. a cam-ring having a portion of small diameter to engage said snapring and hold it in engagement with said threaded male coupling, and a portion of large diameter which permits said snapring to expand and allow introduction and removal of said male coupling, wherein said portion of small diameter and said portion of large diameter are axially aligned, and wherein said cam-ring is operatively positioned with respect to said retainer, said resilient seal having a Durometer value of less than 50 and which abuts said male coupling and resiliently compresses to permit mating of the threads of said male coupling with said snapring upon introduction of said male coupling, and further wherein said cam-ring is held in position after introduction of said threaded male coupling and engaging of said small portion of said cam-ring with said snapring solely by friction means consisting of at least one nib on the terminal end of said small portion of said cam-ring frictionally contacting the outside surface of said retainer and said snapring frictionally contacting the inside surface of said small portion of said cam-ring.

2. A quick connect-disconnect according to claim 1 in which said snapring is provided with threads for engagement with a threaded male coupling.

3. A quick connect-disconnect according to claim 1 in which said snapring has an expansion opening.

4. A quick connect-disconnect according to claim 1 in which said retainer is provided with a threaded end portion.

5. A quick connect-disconnect according to claim 1 in which said snapring is resiliently sprung inwardly.

6. A quick connect-disconnect according to claim 1 in which said snapring is resiliently sprung outwardly.

* * * * *